Dec. 19, 1933.  C. R. MEITZLER  1,939,715
STERILIZER
Filed May 26, 1932  2 Sheets-Sheet 1

Inventor
Charles R. Meitzler
By: Brown, Jackson,
Boettcher & Dienner,
Attys.

Dec. 19, 1933.   C. R. MEITZLER   1,939,715
STERILIZER
Filed May 26, 1932   2 Sheets-Sheet 2
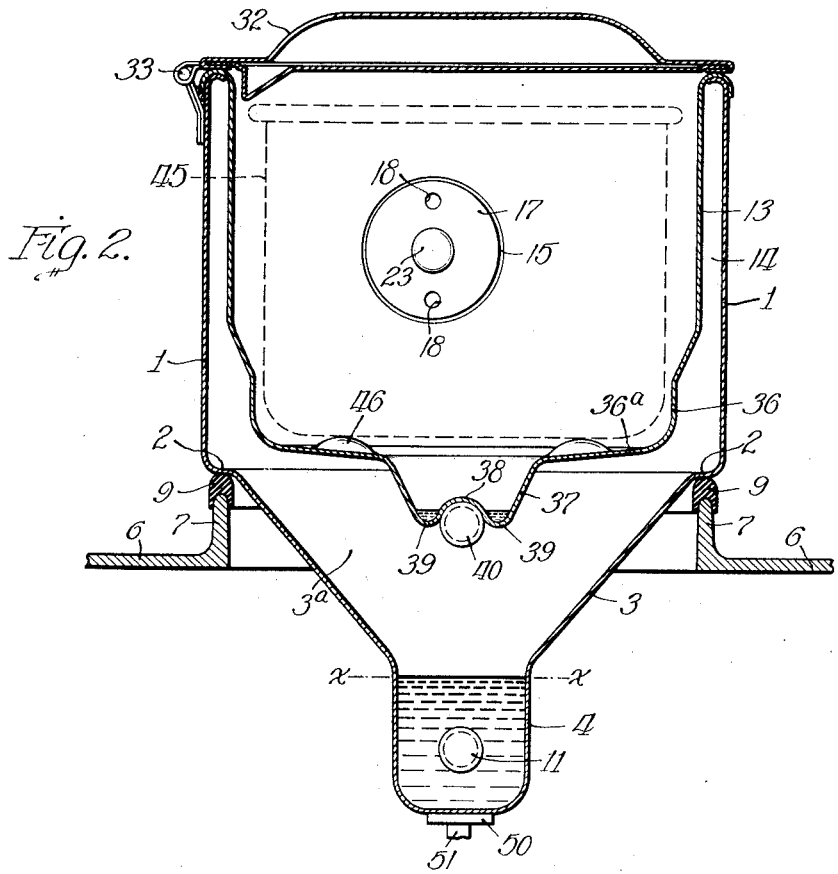
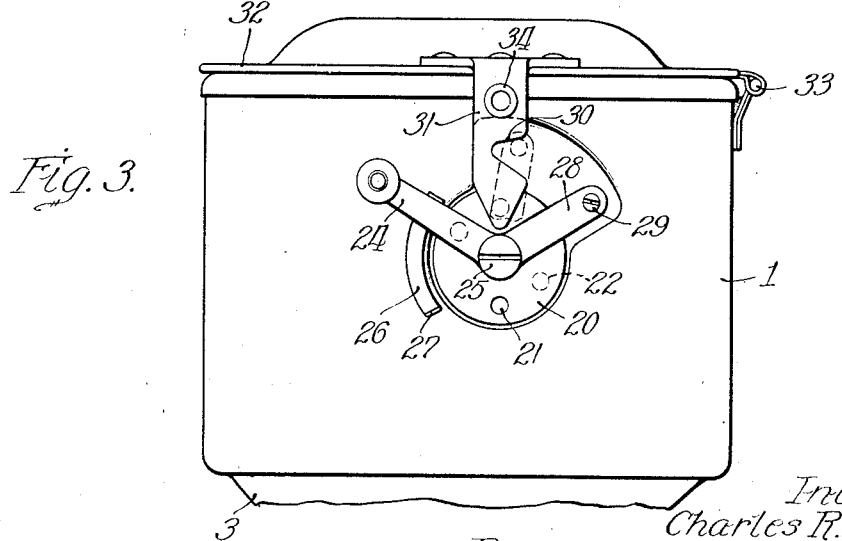
Inventor:
Charles R. Meitzler
By: Brown, Jackson, Boettcher &
Dienner,
Attys.

Patented Dec. 19, 1933

1,939,715

UNITED STATES PATENT OFFICE

1,939,715

STERILIZER

Charles R. Meitzler, Rochester, N. Y., assignor to Oscar H. Pieper and Alphonse F. Pieper, Rochester, N. Y.

Application May 26, 1932. Serial No. 613,708

5 Claims. (Cl. 167—3)

This invention relates to sterilizers, and has to do particularly with sterilizers for use in sterilizing towels, surgical dressings, and analogous articles.

The primary object of my invention is to provide a sterilizer of simple construction and high efficiency by means of which towels, surgical dressings and analogous articles can be thoroughly sterilized with expedition and facility. A further object is to provide a sterilizer of the character stated comprising heating elements so disposed as to assure maximum heating effect of such elements during the sterilizing and drying operations. Further objects and advantages of my invention will appear from the detail description.

In the drawings:—

Figure 2 is a section taken substantially on line 2—2 of Figure 1, parts being shown in elevation;

Figure 3 is an end view of the sterilizer looking at the valve end thereof, the lower portion of the sterilizer being broken away.

Figure 1:
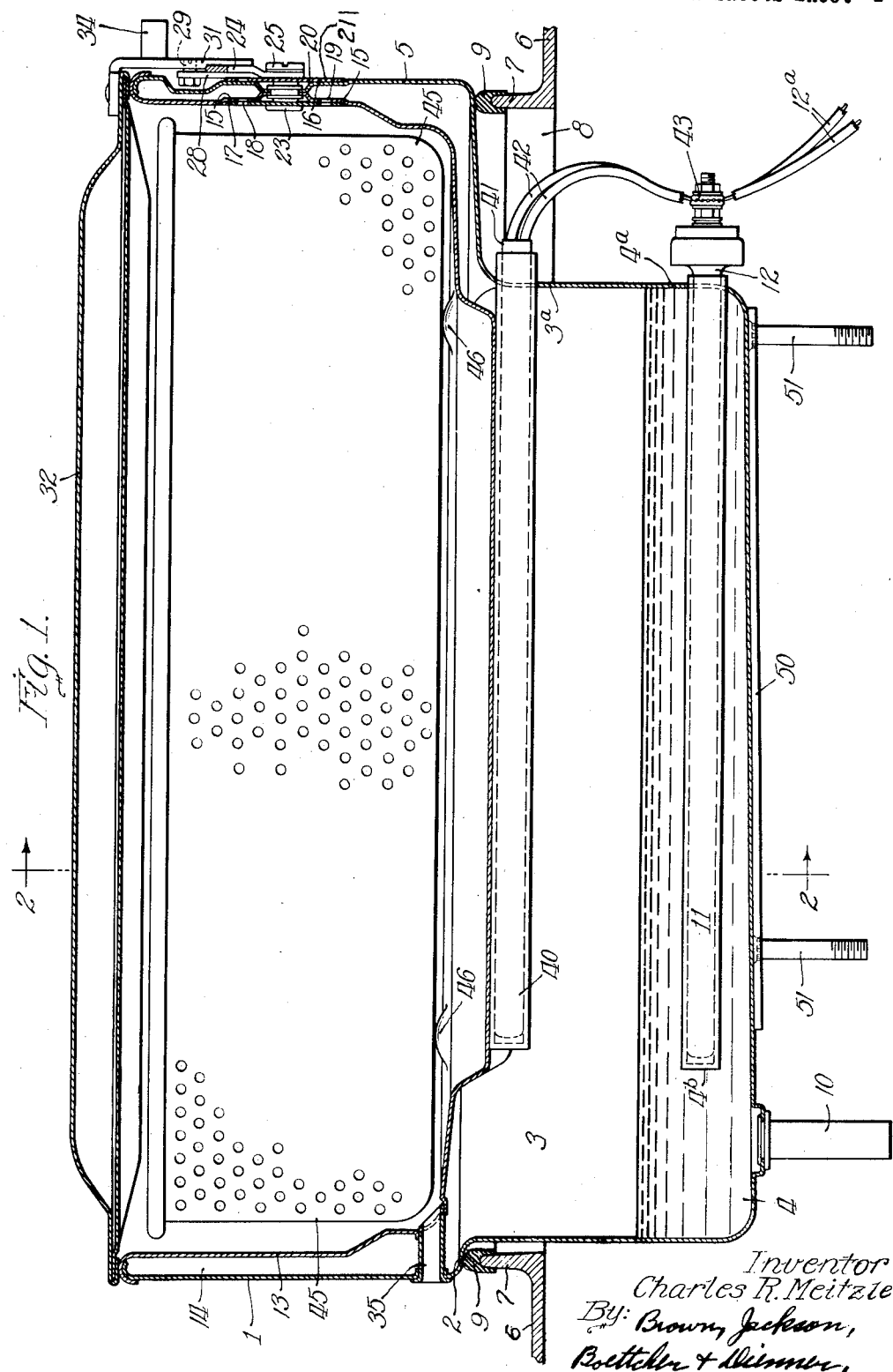
Figure 1 is a vertical sectional view through a sterilizer constructed in accordance with my invention, and the supporting means therefor, parts being shown in elevation.

The sterilizer comprises a sheet metal tank 1, the lower portion of which is reduced in width and length to form a shoulder 2 extending about the tank, from which the lower walls of the tank are inclined downwardly and inwardly from each side thereof to the upper edges of the side walls of a relatively narrow trough 4 which depends from the inclined side walls 3 of the tank. This trough terminates an appreciable distance from end wall 5 of the tank, as illustrated in Figure 1. The reduced lower portion of the tank is intended to extend through a suitable opening in a support 6, such as the top of a cabinet or other suitable structure for supporting sterilizing apparatus. An upwardy extending flange 7 extends about opening 8 of the support or top 6, and a rim 9 of any suitable heat insulating material is suitably mounted upon flange 7, as by being molded thereon. Shoulder 2 of tank 1 seats upon rim 9 which serves to thermally insulate the tank from support or top 6.

An inlet nipple 10 is suitably secured to and opens into trough 4 adjacent one end thereof, the bottom wall of the trough being inclined downwardly toward this nipple. The nipple 10 is connected to any suitable means for supplying water to trough 4, such means preferably being adapted to maintain the water in the trough at a constant level. The normal water level is indicated by the line x—x in Figure 2. A tube 11, formed of brass or other suitable material, is suitably secured through end wall 4a of tank 4. This tube is closed at its inner end, at 4b, and is open at its outer end for reception of an electrical heating element 12 of known type which may be inserted into and withdrawn from the tube 11 through the open outer end thereof. The heating element 12 includes a resistance element which may be connected by leads 12a to a suitable source of electrical energy. The tube 11 is disposed substantially centrally of the body of water in the trough 4 so as to be completely submerged by the water in such manner that the heat from element 12 is radiated into the water throughout the whole area of tube 11. The body of water within the trough 4 is small and is quickly heated to boiling temperature by the element 12, which is advantageous as conserving electrical energy utilized for heating the element 12.

The steam generated by heating of the water in trough 4 flows upwardly into tank 1 and about a sheet metal container 13 supported within the tank in spaced relation thereto and defining therewith a steam space 14. Conveniently, the container 13 is suspended from the upper edge of the tank, which is turned downwardly and inwardly, by being turned downwardly and outwardly over the tank edge. This serves both to suspend the container from the tank and to close the upper end of the steam space 14.

Container 13 is provided, at one end thereof, with a circular depression 15 disposed coaxially with a similar depression 16 in end wall 5 of tank 1. A disc valve 17 is mounted in depression 15 and is provided with ports 18 which register with similar ports 19 extending through depression 15 when the valve disc 17 is moved into the position shown in Figure 1. A valve disc 20 is mounted in depression 16 of wall 5 of the tank 1 and is provided with ports 21 disposed to register with ports 22 extending through depression 16 of wall 5, upon proper adjustment of valve 20. The valves 17 and 20 are suitably secured upon a stud 23 to the outer end of which an operating handling 24 is secured by a screw 25. Movement of this handle in either direction is limited by an arcuate stop member 26 secured to the outer face of wall 5, this member being provided at each end thereof with an outwardly projecting flange constituting a stop element 27. An arm 28 extends from handle 24 at an angle thereto, this arm being formed integral with the handle, or otherwise rigid therewith. A pin 29 extends outwardly from arm 28 and is disposed to contact a cam surface 30 of an arm 31 suitably secured to and depending from the adjacent end of cover 32 of tank 1, this cover being suitably hinged at 33. A stud 34 projects from arm 31 and provides means for connecting to this arm suitable mechanism for opening and closing cover 32. When handle 24 of the valve structure is in the position shown in Figures 1 and 3, ports 22 are closed by the valve disc 20 and ports 18 of valve disc 17 are in register with ports 19 so as to admit steam from space 14 into the container 13. When handle 24 is moved downwardly into its lowermost position, ports 19 are closed and ports 21 of valve disc 20 are moved into register with ports 22, thus cutting off steam from space 14 to the container 13 and venting this space to the atmosphere. As handle 24 approaches its lowermost position, pin 29 contacts cam surface 30 and opens the cover 32 to a predetermined extent, thus permitting escape of steam from the container 4 for drying the sterilized articles therein. The valve structure and the means for operating the same and for opening the cover 32 are disclosed more fully in my copending application for Sterilizing Means, Serial No. 613,707, filed May 26, 1932, and need not be further illustrated nor described here, it sufficing to state that suitable means may be provided for optionally establishing and cutting off communication between space 14 and the interior of container 13.

The container 13 is provided, at the end thereof remote from depression 15, with a tube 35 which opens through the adjacent wall of tank 1 and into the container at the bottom thereof. With the exception of this tube and the ports 19, container 13 is imperforate. The lower portion 36 of container 13 is reduced in width to facilitate entry of steam into the space 14, and this container is provided, at the central portion thereof, with a depending trough-like structure 37 shaped to provide an upwardly extending central element 38 of arcuate cross-section and downwardly extending side elements 39 also of arcuate cross-section and merging into the central element 38. The trough structure 37 is much narrower than lower portion 36 of the container and is appreciably shorter than portion 36, the lower walls of which are inclined downwardly to structure 37 so as to drain into the latter. A tube 40, similar to tube 11 and formed of brass or other suitable material of high heat conductivity, is secured through end wall 3a of the lower reduced portion of tank 1, this tube fitting snugly into the element 38 in which it may be secured in any suitable manner in close contact therewith. The outer end of the tube 40, which extends through wall 3a, is open and this tube slidably receives an electrical heating element 41 of known type, which element includes a resistance element, the latter being connected by leads 42 to binding posts, one of which is shown at 43, to which the leads 12a of element 12 are secured. The two heating elements are thus connected in multiple. The element 12, which heats the water in trough 4 to generate steam is preferably of much greater heat capacity than element 41. Conveniently, element 12 is a 300 watt element, whereas element 41 is a 75 watt element, though the values of these elements may be varied considerably and as conditions require.

The container 13 receives a perforated basket 45 which seats upon rounded projections 46 stuck up from lower walls 36a of lower portion 36 of the container. The basket is supported in spaced relation to the walls of the container and is adapted to contain towels, surgical dressings, or other analogous articles which are to be sterilized. After the basket, with the articles to be sterilized therein, has been placed in the container 13, cover 32 is closed and the circuit of the heating elements 12 and 41 is closed, for which purpose a suitable switch is provided. During the sterilizing operation, the valve handle 24 remains in its upper position shown in Figures 1 and 3. The water in trough 4 is quickly heated to boiling temperature by the heating element 12 so as to generate steam in considerable volume. This steam passes upwardly into the space 14 and thence through ports 18 and 19 into the container 13 in which it collects under appreciable pressure and readily flows into the basket 45 so as to thoroughly penetrate the articles therein. The heat radiated from element 41 and tube 40 serves to raise the temperature of the steam within container 13 appreciably above the temperature of steam at atmospheric pressure, which facilitates and expedites the sterilizing operation. If found desirable or necessary, the tube 35 may be closed in any suitable manner, as by inserting a suitable plug or stopper therein, during the sterilizing operation.

After the articles within the basket 45 have been sterilized, valve handle 24 is moved into its lowermost position so as to vent space 14 to the atmosphere and open the cover 32 slightly, sufficient to permit of ready escape of steam from container 13 and basket 45. Under such conditions, the steam flows upwardly into space 14 so as to heat the container 13, thus heating the articles within basket 45 for drying the same. At this time the tube 35 is open so as to permit of air entering container 13 and flowing about and over the basket 45 and the articles contained therein for taking off the moisture evaporated from such articles. Any water of condensation produced during the drying operation will be drained into the depressed portions 39 of the trough 37 in close proximity to tube 40. The heat generated by heating element 41 serves to quickly convert this water into steam and to produce an upwardly flowing current of heated air which, in conjunction with the heating of the container 13 by the steam flowing through space 14, serves to quickly and thoroughly dry the articles in the basket 45. The two heating elements 12 and 41 thus cooperate to expedite sterilizing of articles placed within the container 13 and the drying of such articles after sterilizing thereof.

The sterilizer may be supported in any suitable or preferred manner, as above noted. When this sterilizer is supported by means of the cabinet top or support 6, I preferably provide suitable means for anchoring the sterilizer against upward movement during opening of the cover 32. For this purpose, a plate 50 is secured to the bottom of tank 4. Screw studs 51 are suitably secured through and depend from this plate. These studs are intended to pass through suitable anchoring means (not shown), nuts (not shown), or equivalent members being screwed onto the studs and contacting the under face of the anchoring means.

What I claim is:—

1. In sterilizing means of the character described, a tank for containing water in the lower portion thereof at a predetermined normal level, heating means within the tank below said level, a container supported within the upper portion of the tank in spaced relation thereto and defining, with the surrounding wall of the tank, a steam space closed at its upper end and communicating at its lower end with the lower portion of the tank, heating means within the tank above the water level thereof and effective for heating steam generated from water heated in the lower portion of the tank, and means for optionally establishing and cutting off communication between the steam space and the container.

2. In sterilizing means of the character described, a tank for containing water in the lower portion thereof and at a predetermined level, heating means within the tank and below said level, a container supported within the upper portion of the tank in spaced relation thereto and defining, with the surrounding wall of the tank, a steam space closed at its upper end and communicating at its lower end with the lower portion of the tank, and heating means above said water level and in close proximity to the bottom of the container and effective for heating the latter.

3. In sterilizing means of the character described, a tank for containing water in the lower portion thereof and at a predetermined level, means for heating water in the lower portion of the tank, a container supported within the upper portion of the tank and defining therewith a steam space surrounding the container closed at its upper end and communicating at its lower end with the lower portion of the tank above the water level therein, and heating means within the tank above the water level of the latter and in close proximity to the bottom of the container.

4. In sterilizing means of the character described, a tank for containing water in the lower portion thereof and at a predetermined level, means for heating water in the lower portion of the tank, a container supported within the upper portion of the tank and defining therewith a steam space surrounding the container closed at its upper end and communicating at its lower end with the lower portion of the tank above the water level therein, and heating means within the tank above the water level of the latter and in heat conducting relation to the container.

5. In sterilizing means of the character described, a tank for containing water in the lower portion thereof and at a predetermined level, means for heating water in the lower portion of the tank, a container supported within the upper portion of the tank and defining therewith a steam space surrounding the container closed at its upper end and communicating at its lower end with the lower portion of the tank above the water level therein, and heating means within the tank above the water level of the latter and beneath the container, the heating means within the tank being in close proximity and in heat conducting relation to the bottom of the container.

CHARLES R. MEITZLER.